United States Patent
Hala et al.

(10) Patent No.: US 8,054,069 B2
(45) Date of Patent: Nov. 8, 2011

(54) SELF-ADJUSTING MULTI-EVENT TIMING APPARATUS

(75) Inventors: Roger Aloysius Hala, Gardnerville, NV (US); Brooke Margaret Bunzmann, Stateline, NV (US)

(73) Assignee: General Electric Company, Schenectady, NY (US)

( * ) Notice: Subject to any disclaimer, the term of this patent is extended or adjusted under 35 U.S.C. 154(b) by 375 days.

(21) Appl. No.: 12/496,825

(22) Filed: Jul. 2, 2009

(65) Prior Publication Data
US 2011/0001471 A1 Jan. 6, 2011

(51) Int. Cl.
G01B 7/14 (2006.01)
G01B 7/30 (2006.01)

(52) U.S. Cl. .............. 324/207.25; 324/207.15; 324/260; 324/262

(58) Field of Classification Search ............. 324/207.25, 324/207.15, 260, 262
See application file for complete search history.

(56) References Cited

U.S. PATENT DOCUMENTS

| 4,580,047 A * | 4/1986 | Sasaki et al. ............. 250/231.16 |
| 5,933,005 A * | 8/1999 | Pugh ........................ 324/207.25 |
| 6,492,807 B2 * | 12/2002 | Spellman ................ 324/207.22 |
| 7,026,808 B2 * | 4/2006 | Vig et al. ...................... 324/179 |

\* cited by examiner

*Primary Examiner* — Reena Aurora
(74) *Attorney, Agent, or Firm* — Pearne & Gordon LLP

(57) ABSTRACT

An apparatus for providing an indication of rotational position of a shaft by parameter change. The apparatus includes a resilient, serpentine-shaped middle portion, a first end portion located at one end of the middle portion, and a second end portion at another end of the middle portion. The second end portion is for location adjacent to the first end portion to permit securing of the first and second ends together subsequent to the middle portion being resiliently extended around the shaft. The serpentine-shaped middle portion is sized to be taut on the shaft and is shaped to have a plurality of undulations. The undulations providing a plurality of event members each having at least one characteristic that causes a change of a parameter that can be sensed by a sensor when the event member rotates past the sensor.

12 Claims, 4 Drawing Sheets

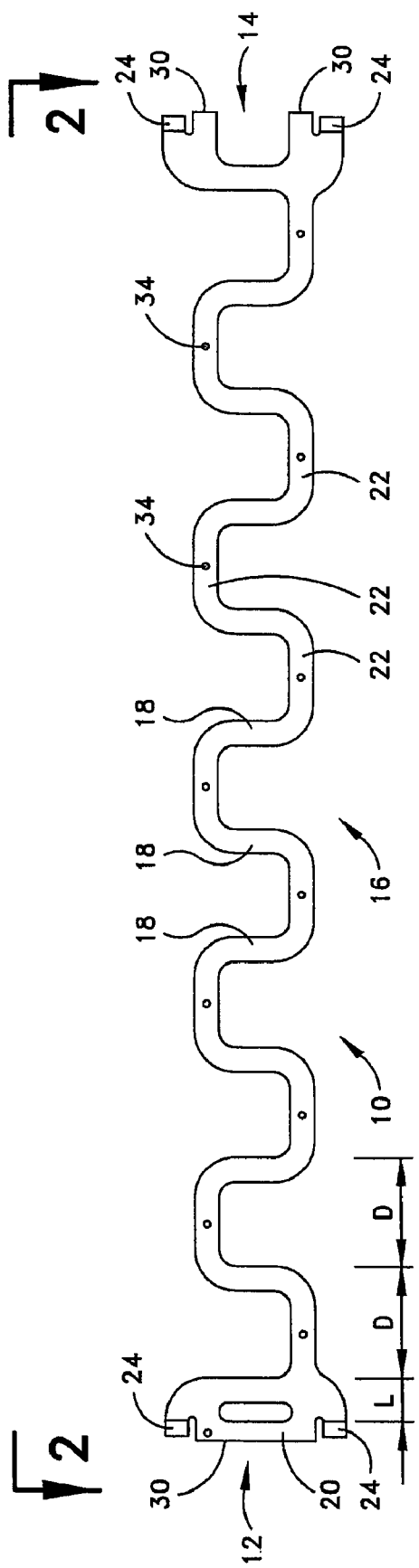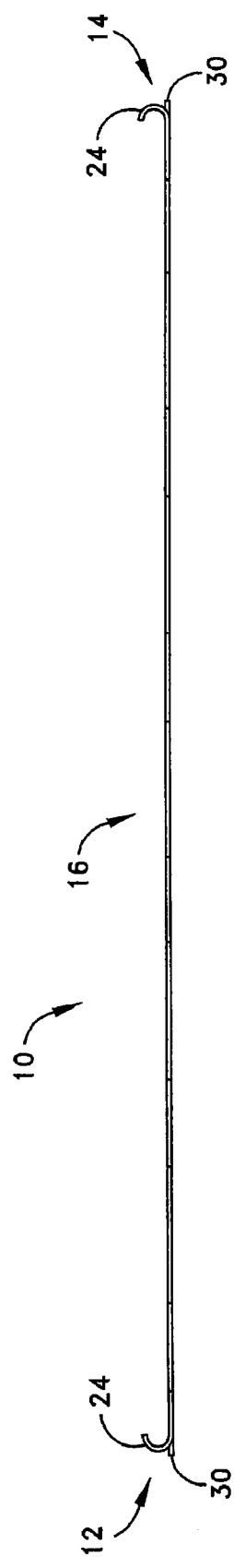

US 8,054,069 B2

SELF-ADJUSTING MULTI-EVENT TIMING APPARATUS

BACKGROUND OF THE INVENTION

1. Field of the Invention

The present invention relates generally to position monitoring/analysis of rotating machinery, and more particularly, to ease of accurately establishing mechanical angular position of rotating shafts.

2. Discussion of the Prior Art

Machinery that includes a rotating shaft may use a multi-event timing wheel to accurately establish mechanical angular position during shaft rotation. Often, requirements for a timing wheel are met for each installation by custom designing a wheel. The wheel must be fabricated with a precision inside diameter to fit a shaft diameter. The wheel is then split in half and clamped around the shaft. If the shaft diameter is incorrectly measured as too large or too small, the clamped design will not properly fit the shaft.

The process of splitting the timing wheel in half involves a saw which often leaves a kerf. The existence of the kerf allows over-tightening of the timing wheel which reduces the spacing of the kerf. This condition may result in an unequal spacing of the events in the wheel and subsequent error in the measured position. Alternatively, some machining of the timing wheel is done, the wheel is split in half, and then a spacer with the width of the kerf is added to the timing wheel so the rest of the machining can be completed. This adds complexity and cost to the manufacture of the timing wheel.

Timing wheels are often installed on the end of the rotating shaft. However, in many installations, the shaft ends are not accessible or the shaft ends are not suitable for installation of a timing wheel. As a result, an alternate location on the shaft must be selected. Frequently, the selected alternate location is an exposed location of the shaft adjacent to a bearing or rigid coupling. At times, an installation at these locations requires some amount of disassembly of the machinery to fasten the timing wheel to the shaft.

Accordingly, there is a need for a timing wheel apparatus for improving accuracy, minimizing production cost, and reducing disassembly of machinery during application of the timing wheel.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the invention provides an apparatus for providing an indication of rotational position of a shaft on an axis by causing parameter change upon rotation of the shaft. The apparatus includes a resilient, serpentine-shaped middle portion for extending around the shaft, a first end portion located at one end of the middle portion, and a second end portion at another end of the middle portion. The second end portion is for location adjacent to the first end portion to permit securing of the first and second ends together subsequent to the middle portion being resiliently extended around the shaft. The serpentine-shaped middle portion is sized to be taut on the shaft when the first and second end portions are secured together and being shaped to have a plurality of undulations. The undulations provide a plurality of event members each having at least one characteristic that causes a change of a parameter that can be sensed by a sensor when the event member rotates past the sensor during rotation of the shaft and the apparatus located thereon relative to the sensor.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 1 is a is a plan view of an example apparatus for indicating rotational position and thus rotational timing in accord with one aspect of the present invention prior to application to a shaft;

FIG. 2 is an edge view of the example apparatus of FIG. 1;

DETAILED DESCRIPTION OF THE INVENTION

Figure 3:
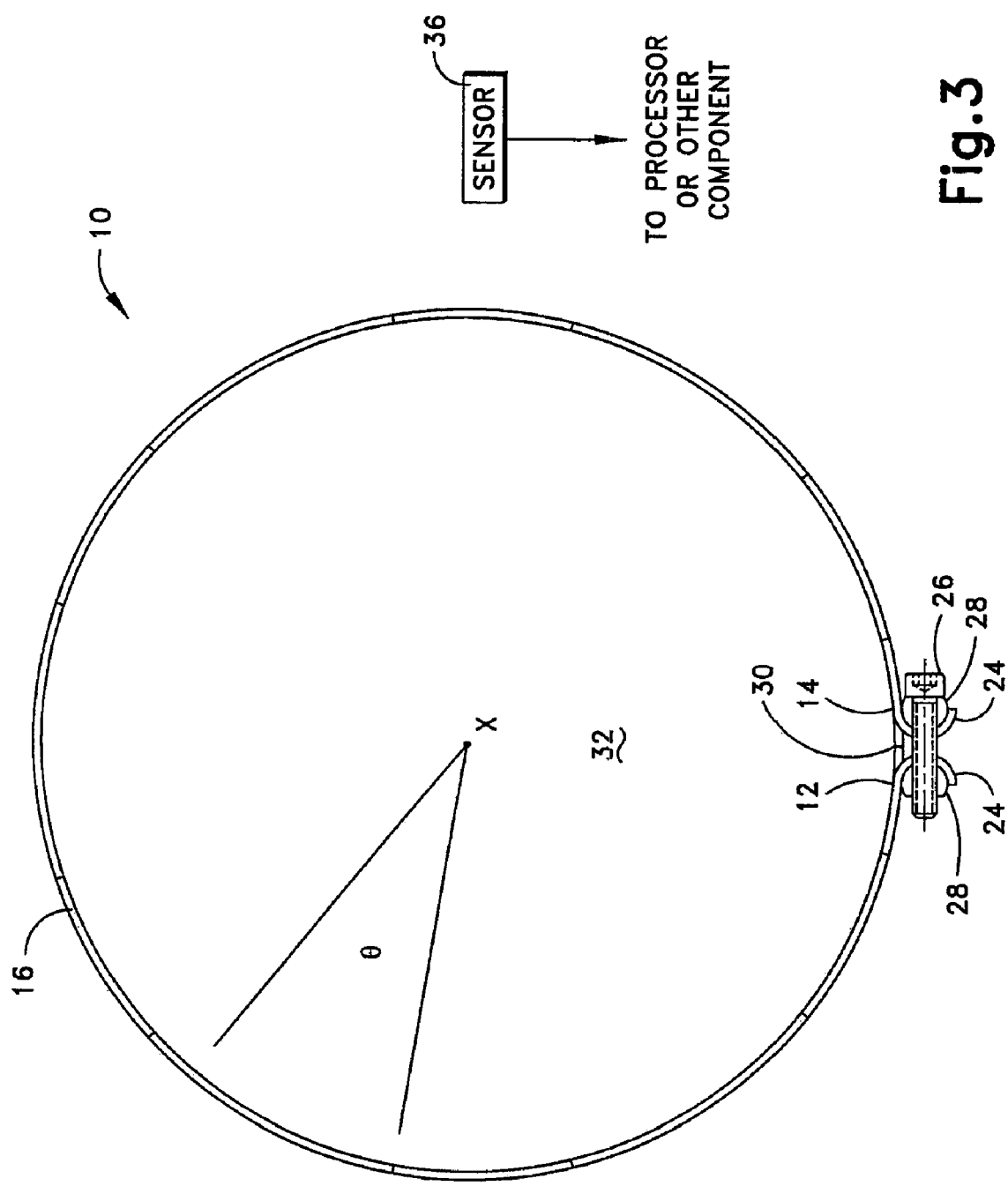
FIG. 3 is a view of the example apparatus of FIG. 1 after the apparatus is placed around a shaft and end portions of the apparatus are secured together.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

The invention relates generally to an apparatus used for position monitoring/analysis of a rotating shaft. In one specific example, the apparatus may be integrated into an initial assembly of machinery which has a rotating shaft. In another specific example, the apparatus may be a retrofit into existing machinery which has a rotating shaft. Such choice (i.e., initial construction or retrofit) is not a limitation on the present invention. Also, in one specific example, the apparatus is used for rotational timing (i.e., knowing a rotational position of a shaft at a specific moment in time).

Turning to FIGS. 1 and 2, an example apparatus 10 is shown in accordance with one aspect of the subject invention. FIGS. 1 and 2 show the apparatus in an initial, flat state. The apparatus 10 is positioned on a shaft 32 as shown in FIG. 3 for operation. The apparatus 10 provides an indication of rotational position via the occurrence of a plurality (i.e., a multitude) of events that occur as the shaft 32 rotates on an axis X. As such, the apparatus 10 is referred to further herein as a multi-event timing apparatus 10. The positioning of the multi-event timing apparatus 10 on the shaft 32 is described further below.

Focusing on just the multi-event timing apparatus 10 (FIG. 1), the apparatus includes first and second end portions 12, 14 and a middle portion 16 there between. In the shown example, the first end portion 12, the second end portion 14 and the middle portion 16 are unitary (i.e., made as a single piece, monolithic). However, it is contemplated that the apparatus 10 could be made of components connected together (e.g., the middle portion 16 connects to the first end portion 12 and the second end portion 14).

The middle portion 16 includes a plurality of event members 18. Each event member 18 is spaced at an interval distance D. The number of event members 18 and the spacing interval D may be varied and may be selected based upon diameter of the shaft and/or desired resolution of the indication of the rotational position of the shaft. In the shown example there are twelve event members 18. Of course, a different number of event members may be utilized. The number may be selected to meet sensing parameters. For example, the selection may be based upon use for overspeed and tachometer functions.

In the shown example of FIG. 1, the event members 18 are positioned over a span of the entire length of the flat multi-event timing apparatus 10. In the shown example, the event members 18 are segments of the apparatus 10 that extend parallel to each other. Also, the event members 18 are oriented parallel to the axis X of the shaft 32. Adjacent event members 18 are connected at one side by a side member 22. As shown in FIG. 1, the side members 22 provide the connection on alternating sides of the apparatus 10 resulting in a serpentine shape for the middle portion 16 of the apparatus. Thus, the middle portion has a series of undulations, with the undulations providing the event members 18 in a configuration so that sensing may occur as discussed below. Most of the event members 18 are connected to a different side member 22 at each different end of the specific event member 18, with the side members 22 extending in opposite directions from the specific event member 18. The event members 18 at the ends of the middle portion 16 are only connected to a single side member 22. In the shown example, the event members 18 and the side members 22 are generally straight segments, the serpentine shape is similar to a square wave pattern. However, this is only one example shape. It should be noted that the shown example has some rounding at the interconnections of the event members 18 and the side members 22. The shapes of the event members 18 and the side members 22 and the intersections thereof may be varied within the scope of the invention. It is to be appreciated that the multi-event timing apparatus 10 and the event members 18 may have other combinations of shapes and arrangements.

The apparatus 10 includes means 24-28 of attachment for attaching the first and second end portions 12 and 14 together. Such attaching secures the first end portion 12 to the second end portion 14. Logically, with the first end portion 12 secured to the second end portion 14, the apparatus is in the form of a circle (see FIG. 3). Also, the apparatus 10 encircles the shaft 32. In the shown example (again see FIG. 3), the means of attachment includes tabs 24, on the first and second end portions 12 and 14, a threaded fastener 26 and threaded nut members 28. Focusing upon the tabs 24, attention is directed to FIG. 2, which shows a side view of the example apparatus 10 and an example of the tabs 24. It is to be appreciated that the shown example of the tabs 24 need not be a limitation upon the present invention. The tabs 24 are curved in this example. In the shown example (see FIG. 1), the tabs are located on the event members 18 at the ends of the middle portion 16.

Turning to the fastener 26 (see FIG. 3), the fastener 26 extends from the location of the tabs 24 on the first end portion 12 to the location of the tabs 24 on the second end portion 14.

In the shown example, the threaded nut members 28 have mating surfaces that mirror the profiles of the tabs 24 and as such nest into the tabs 24. The fastener 26 and/or the nut members 28 may have a thread arrangement so that rotation of the fastener causes a tightening/loosening effect at both nut members. The means of attachment may take various other forms such as hooks and loops, flat surfaces with a clip device, flat surfaces for welding or adhesive, or any other means known to secure the first end portion 12 to the second end portion 14.

The first end portion 12 and the second end portion 14 include a structure extending from the nearest event member 18 to a mating surface 30 of the end portions. Tabs 24 are formed into the first and second end portions 12, 14 such that the tab shape is not to extend beyond the mating surface 30 of the first end portion 12 or the mating surface 30 of the second end portion 14. Turning to FIG. 2 it can be seen that the mating surfaces 30 of the first end portion 12 and the second end portion 14 lie in the same plane as the middle portion 16 of the multi-event timing apparatus 10. The mating surface 30 of the first end portion 12 and the mating surface 30 of the second end portion 14 are congruent when placed into contact with one another (see FIG. 3). For example, the second end portion 14 may have a flat mating surface 30 that mates against the flat mating surface 30 of the first end portion 12. It is to be appreciated that the mating surfaces 30 of the first and second end portions 12, 14 may have any shapes that will be congruent with the opposite mating surface 30.

There may be at least one "once per turn" event member 20 (see FIG. 1) which is incorporated into one of the end portions (e.g., 12). The once per turn event member 20 is located a distance L from the closest event member 18 of the middle portion 16. The distance L is shorter than the distance D which separates the remainder of the event members 18.

As should be appreciated, the apparatus 10 is made of a material that permits bending (e.g., for wrapping of the apparatus around the shaft 32) without the apparatus breaking. Accordingly, the apparatus 10 is resilient. The material of the apparatus 10 and/or the serpentine shape provide for the ability of the apparatus to be wrapped around the shaft 32. Also, the material of the apparatus 10 and/or the serpentine shape together with the means 24-28 of attachment provide for the apparatus being taut on the shaft 32. Thus, the apparatus 10 retains itself in position on the shaft without slipping movement.

One aspect of the invention is to locate each event member 18 an equal distance from the next event member as they are spread around the circumference of the shaft 32. Alternatively stated, each event member 18 is separated by an equal angle θ. One method to accomplish an equal distribution of event members 18 is to apply a uniform tension force to the multi-event timing apparatus 10. The multi-event timing apparatus 10 is tensioned to be taut on the shaft 32. The uniform distribution of tensile force to the multi-event timing apparatus 10 may increase each of the distance D measurements, but would impose an equal length increase on each distance D. This places each of the event members 18 in the middle portion 16 at a fixed angle of displacement from the nearest event member. The structure of the first end portion 12 and the second end portion 14 transmits the tension through the middle portion 16 of the multi-event timing apparatus 10 while the mating surfaces 30 of the end portions and the once per turn event member 20 are not subject to the same tensile force. The once per turn event member 20 does not have to be subject to the tensile force because its location is not critical for sensing the count of shaft 32 rotations. However, the uniform location of the middle portion 16 event members 18 is useful for improved accuracy of determination of the shaft 32 position.

The event members 18 are designed to have a quality that is detectable by at least one sensor 36 (schematically shown in FIG. 3). Also, the once per turn event member 20 designed to have at least one characteristic that is detectable by the at least one sensor 36. It is to be noted that the sensor 36 is schematically shown to convey the concept that the sensor may sense any of plural, different characteristics and may have a variety of constructions and configurations. The sensor 36 may even simultaneously sense plural characteristics. Also, multiple sensors 36 may be utilized and may be co-located or spaced about the periphery. Such multiple sensors 36 are collectively represented by the schematically shown sensor 36 of FIG. 3.

Each of the event members 18 has/provides attributes that provides the characteristic(s) that are detectable by the sensor 36. For example, the event members 18 may have a magnetic quality that alters a magnetic field as the event members move (rotate) past the sensor 36. The changing magnetic field may be sensed (e.g., "read") by the sensor 36 by detecting the changing magnetic field caused by the motion of each event member 18 as the multi-event timing apparatus 10 revolves around the shaft 32 axis X. As another example, the event members 18 may have a quality that provides an eddy current. As the event members 18 move (rotate) past the sensor 36 the value associated with local eddy current with change (e.g., a rise or drop). The sensor 36 senses the change (e.g., a rise or drop) in the eddy current value as the event members 18 revolve around the shaft 32 axis X. As a further example, the event members 18 may have certain reflective/absorptive qualities that alter light reflection/absorption. The changing light reflection/absorption pattern may be sensed (e.g., "read") by the sensor 36 by detecting the change in light between the event member 18 and the shaft 32 as the multi-event timing apparatus 10 revolves around the shaft 32 axis X. The reflective/absorptive qualities that alter light reflection/absorption are examples of optical properties.

It is to be appreciated that the sensing may be considered to provide a relative indication of rotational position of the shaft 32. For example, the number of times that event members 18 pass the sensor will result in a corresponding number of event occurrences. It is the number of events that can provide an indication of relative amount of rotation. Such relative rotation information may be useful for determining rotational speed and the like. It is also to be appreciated that the sensing may be considered to provide an absolute indication of rotational position of the shaft 32. For example, sensing of the once per turn event member 20 can provide an absolute indication of rotational position. Also, a specific number of sensed events since sensing of the once per turn event member 20 can provide an absolute indication of rotational position (e.g., θ multiplied by the number of events provides angular distance from the location of the per turn event member 20).

After sensing (e.g., "reading") the event member 18 position, the sensor is able to send a signal to an electronic processor or other component(s) (not shown) that generates an accurate angular reference for measurements. The shown example may also generate readings for the rotational speed or revolutions per minute (rpm) of the shaft 32, the number of rotations from a set time, the direction of shaft 32 rotation, or many other device related parameters. Other algorithms may be used to make more complicated determinations, such as the position of other equipment attached to the shaft 32, such as piston rods, pistons, valves, and the like. For example, one algorithm may measure and analyze the position of the piston rod at each degree of crank angle. Shaft 32 position and rotation speed may also be used in calculations to determine horsepower, amount of a fluid pumped by a reciprocating compressor, or any number of other various calculations.

In the shown example, the length of the multi-event timing apparatus 10 is slightly shorter than the circumference of the shaft 32. In one example, the length of the multi-event timing apparatus 10 is approximately 0.025 inches to 0.075 inches shorter than the circumference of the shaft 32. Of course, a different dimension may be utilized. The multi-event timing apparatus 10 is wrapped around the shaft 32. The first end portion 12 and the second end portion 14 are brought together to be fastened, placing the multi-event timing apparatus 10 in tension. A spring-like characteristic of the multi-event timing apparatus causes the event members 18 in the middle portion 16 to be distributed evenly around the circumference of the shaft 32. In the shown example, there are twelve event members 18 in the middle portion 16, requiring each event member to be spaced apart by 30° from the next event member. Of course, a different number of event members may be utilized. It is to be appreciated that there are other means to accomplish the application of tension to the multi-event timing apparatus 10. For example, a slotted band acting as a pipe clamp may be placed in tension by tightening a screw.

Figure 4:
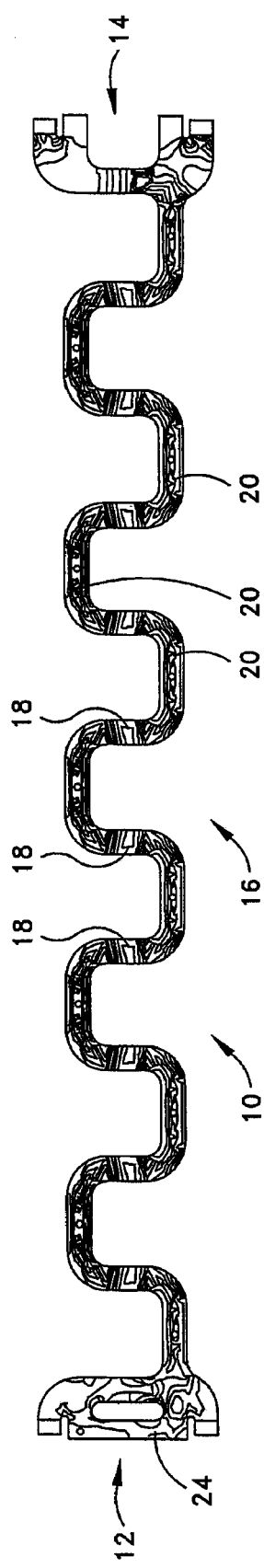
FIG. 4 is a two-dimensional stress map of the example apparatus completed with a finite element analysis software program.

Turning to FIG. 4, an example finite element analysis (FEA) stress analysis is shown for the multi-event timing apparatus 10. The multi-event timing apparatus 10 construction material and dimensions must be suitable in order to keep the part in the elastic deformation range when elongated 2.2%. Of course, a different elongation may be utilized. In one respect, the smaller length allows the apparatus 10 to fit tightly on the shaft 32 and to apply enough stress to cause all of the undulations to shift uniformly, and yet not have so much stress that elastic limits of the material are exceeded. In one example, the material may be steel. In another example, the material may be 4130 steel. The 4130 steel may have the following percentage components added to Iron: Carbon 0.28-0.33, Chromium 0.8-1.1, Manganese 0.7-0.9, Molybdenum 0.15-0.25, Phosphorus 0.035 max, Silicon 0.15-0.35, and Sulphur 0.04 max. It is to be appreciated that different material may be used. The width of the multi-event timing apparatus 10 must be wide enough to accommodate a reasonable axial movement of the shaft 32 during operation while the sensor is still able to sense the event members 18. The thickness of the multi-event timing apparatus 10 must be thick enough to provide an adequate signal to the sensor, but thin enough to act as spring material and to be able to be formed around the shaft 32.

Figure 5:
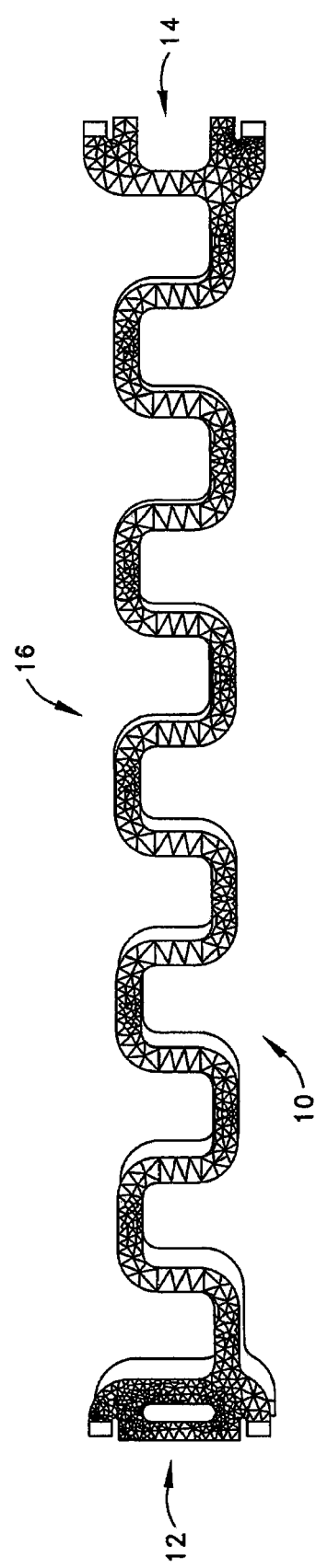
FIG. 5 is a two-dimensional strain map of the example apparatus completed with a finite element analysis software program.

Turning to FIG. 5, an example FEA displacement analysis is shown. This figure demonstrates the calculated displacement of the multi-event timing apparatus 10 under an applied load needed to fasten the first end portion 12 to the second end portion 14 while the multi-event timing apparatus is in place around the shaft 32.

Figure 6:
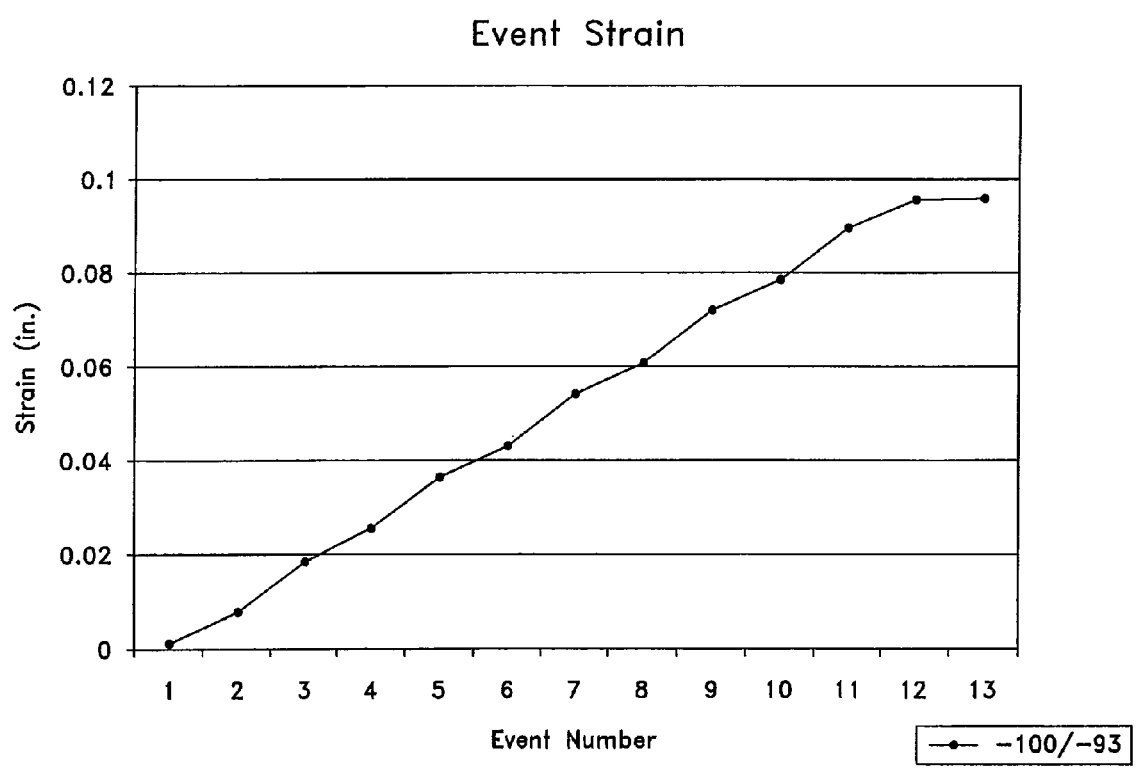
FIG. 6 is a chart representing the computed strain at each of the event members for the example multi-event timing apparatus.

Turning to FIG. 6, a chart is shown representing a computed strain at each of the event members 18 for the example multi-event timing apparatus 10.

Turning back to FIG. 1, each side member 22 of the middle portion 16 may include an aperture 34. The apertures 34 may be used to positively index the multi-event timing apparatus 10 with the shaft 32. Keys may be placed in keyways in the shaft 32 and the apertures 34 in the multi-event timing apparatus 10 fit over the keys. This positive indexing allows a user of the device to determine the exact location of the multi-event timing apparatus 10 on the shaft 32.

Multiple multi-event timing apparatuses 10 may be placed on the same shaft 32. For example, in an application using a long rotating shaft 32, a multi-event timing apparatus 10 may be placed at each end of the shaft 32 or at intermediate locations on the shaft. Readings from multiple locations of the multi-event timing apparatus 10 devices may be useful to calculate the shaft 32 flexion between multiple points, stresses, strains, and any number of other attributes of the rotating shaft.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. An apparatus for providing an indication of rotational position of a shaft on an axis by causing parameter change upon rotation of the shaft, the apparatus including:
    a resilient, serpentine-shaped middle portion for extending around the shaft;
    a first end portion located at one end of the middle portion; and
    a second end portion at another end of the middle portion, the second end portion for location adjacent to the first end portion to permit securing of the first and second ends together subsequent to the middle portion being resiliently extended around the shaft;
    the serpentine-shaped middle portion being sized to be taut on the shaft when the first and second end portions are secured together and being shaped to have a plurality of undulations, the undulations providing a plurality of event members each having at least one characteristic that causes a change of a parameter that can be sensed by a sensor when the event member rotates past the sensor during rotation of the shaft and the apparatus located thereon relative to the sensor.

2. The multi-event timing apparatus as set forth in claim 1, wherein the parameter is an eddy current.

3. The multi-event timing apparatus as set forth in claim 1, wherein the parameter is a magnetic field.

4. The multi-event timing apparatus as set forth in claim 1, wherein the parameter is an optical property.

5. The multi-event timing apparatus as set forth in claim 1, wherein the multi-event timing apparatus is tensioned to be taut on the shaft, the length of the multi-event timing apparatus in an untensioned state is less than the circumference of the shaft.

6. The multi-event timing apparatus as set forth in claim 5, wherein the length of the multi-event timing apparatus in the untensioned state is 0.025 inches to 0.075 inches less than the circumference of the shaft.

7. The multi-event timing apparatus as set forth in claim 1, wherein the multi-event timing apparatus is made of a material that has a tensile strength suitable to sustain elastic deformation when elongated approximately 2.2%.

8. The multi-event timing apparatus as set forth in claim 7, wherein the material is steel.

9. The multi-event timing apparatus as set forth in claim 1, wherein there are 12 equally spaced features in the multi-event timing apparatus and at least one additional feature on one at least one of the end portions that is located between two of the equally spaced features.

10. The multi-event timing apparatus as set forth in claim 1, wherein the middle section defines apertures that may be used for positive mechanical indexing.

11. The multi-event timing apparatus as set forth in claim 1, wherein the multi-event timing apparatus causes a change in the parameter by rotation of the shaft, so as to provide for detection of the rotation of the shaft.

12. The multi-event timing apparatus as set forth in claim 1, wherein the event members are oriented to extend parallel to the axis of the shaft.

* * * * *